US012402991B2

(12) United States Patent
Steger

(10) Patent No.: US 12,402,991 B2
(45) Date of Patent: Sep. 2, 2025

(54) DENTAL MACHINING SYSTEM FOR PREDICTING THE MACHINING TIME FOR MANUFACTURING A DENTAL RESTORATION/APPLIANCE

(71) Applicant: DENTSPLY SIRONA Inc., York, PA (US)

(72) Inventor: Sebastian Steger, Heppenheim (DE)

(73) Assignee: Dentsply Sirona Inc., York, PA (US)

( * ) Notice: Subject to any disclaimer, the term of this patent is extended or adjusted under 35 U.S.C. 154(b) by 532 days.

(21) Appl. No.: 17/795,156

(22) PCT Filed: Jan. 29, 2021

(86) PCT No.: PCT/EP2021/052158
§ 371 (c)(1),
(2) Date: Jul. 25, 2022

(87) PCT Pub. No.: WO2021/152125
PCT Pub. Date: Aug. 5, 2021

(65) Prior Publication Data
US 2023/0057664 A1 Feb. 23, 2023

(30) Foreign Application Priority Data
Jan. 30, 2020 (EP) .................................. 20154582

(51) Int. Cl.
*G05B 19/18* (2006.01)
*A61C 13/00* (2006.01)
*G05B 19/4155* (2006.01)

(52) U.S. Cl.
CPC ...... *A61C 13/0004* (2013.01); *A61C 13/0022* (2013.01); *G05B 19/18* (2013.01); *G05B 19/4155* (2013.01); *G05B 2219/37355* (2013.01)

(58) Field of Classification Search
CPC ... A61C 13/0004; A61C 13/0022; A61C 5/77; A61C 13/0006; A61C 1/0007;
(Continued)

(56) References Cited

U.S. PATENT DOCUMENTS 5,495,430 A 2/1996 Matsunari
2009/0017410 A1* 1/2009 Raby ...................... A61C 7/146
433/2
(Continued)

FOREIGN PATENT DOCUMENTS

CA 3166313 A1 8/2021
CN 103235556 A * 8/2013
(Continued)

OTHER PUBLICATIONS

Chinese Office action dated Aug. 1, 2024.
(Continued)

*Primary Examiner* — Yuhui R Pan
(74) *Attorney, Agent, or Firm* — SCHWEGMAN LUNDBERG & WOESSNER, P.A.

(57) ABSTRACT

A dental machining system for manufacturing a dental restoration/appliance, including: a dental tool machine which includes: a dental blank holder for movably holding at least one dental blank relative to one or more dental tools; one or more driving units each for movably holding one or more dental tools, a control unit for controlling the dental blank holder and the driving units based on construction data of the dental restoration/appliance and a plurality of machining processes specific for the manufacturing of the dental restoration/appliance from the dental blank. The control unite executes a trained artificial intelligence algorithm that predicts the machining time for manufacturing the dental restoration/appliance based on input data including: process parameters defining the machining processes respectively;

(Continued)

and mappings which include information on the target geometry of the dental restoration/appliance.

14 Claims, 3 Drawing Sheets

(58) Field of Classification Search
CPC .............. G05B 19/18; G05B 19/4155; G05B 2219/37355; G05B 2219/31407; G05B 2219/33002; G05B 2219/33037; G05B 19/4099; G05B 2219/33036; G05B 2219/45167
See application file for complete search history.

(56) References Cited

U.S. PATENT DOCUMENTS

| | | | |
|---|---|---|---|
| 2009/0130634 A1* | 5/2009 | Ganley | A61C 13/0022 433/206 |
| 2018/0028294 A1 | 2/2018 | Azernikov | |

FOREIGN PATENT DOCUMENTS

| | | |
|---|---|---|
| CN | 114981740 A | 8/2022 |
| DE | 19922870 A1 | 12/2000 |
| DE | 102017203475 A1 | 9/2018 |
| EP | 1088526 A2 | 4/2001 |
| EP | 3859466 A1 | 8/2021 |
| EP | 3859466 B1 | 10/2024 |
| JP | 2007025945 A | 2/2007 |
| JP | 2013144137 A | 7/2013 |
| JP | 2015062691 A | 4/2015 |
| JP | 2018073136 A | 5/2018 |
| JP | 2023518642 A | 5/2023 |
| JP | 7589249 B2 | 11/2024 |
| KR | 20220133863 A | 10/2022 |
| WO | WO-2017138120 A1 | 8/2017 |
| WO | WO-2021152125 A1 | 8/2021 |

OTHER PUBLICATIONS

Japanese Office Acted dated Aug. 20, 2024.
International Search Report; PCT/EP2021/052158; Feb. 26, 2021 (completed); Mar. 10, 2021 (mailed).
Written Opinion of the International Searching Authority; PCT/EP2021/052158; Feb. 26, 2021 (completed); Mar. 10, 2021 (mailed).
International Preliminary Report on Patentability; PCT/EP2021/052158; Feb. 26, 2021 (completed); Mar. 10, 2021 (mailed).
"Chinese Application Serial No. 202180011725.9, Office Action mailed Jan. 22, 2025", W/O English Translation, 3 pgs.
"Chinese Application Serial No. 202180011725.9, Office Action mailed Aug. 1, 2024", w/ English translation, 18 pgs.
"Chinese Application Serial No. 202180011725.9, Response filed Mar. 14, 2025 to Office Action mailed Jan. 22, 2025", W/English Claims, 13 pgs.
"European Application Serial No. 20154582.9, Communication Pursuant to Article 94(3) EPC mailed Oct. 18, 2023", 6 pgs.
"European Application Serial No. 20154582.9, Extended European Search Report mailed Jul. 27, 2020", 11 pgs.
"European Application Serial No. 20154582.9, Response filled Jan. 17, 2022 to Extended European Search Report mailed Jul. 27, 2020", 9 pgs.
"European Application Serial No. 20154582.9, Response filed Apr. 29, 2024 to Communication Pursuant to Article 94(3) EPC mailed Oct. 18, 2023", 25 pgs.
"Japanese Application Serial No. 2022-542709, Office Action mailed Aug. 20, 2024", w/ English Translation, 6 pgs.
"Japanese Application Serial No. 2022-542709, Response filed Sep. 20, 2024 to Office Action mailed Aug. 20, 2024", w/ English Claims, 12 pgs.

* cited by examiner

DENTAL MACHINING SYSTEM FOR PREDICTING THE MACHINING TIME FOR MANUFACTURING A DENTAL RESTORATION/APPLIANCE

CROSS-REFERENCE TO RELATED APPLICATIONS

This is a National Phase application of International Application No. PCT/EP2021/052158, filed Jan. 29, 2021, which claims the benefit of and priority to European Application Ser. No. 20154582.9, filed on Jan. 30, 2020, which are herein incorporated by reference for all purposes.

TECHNICAL FIELD OF THE INVENTION

The present invention relates to a dental machining system which has a dental tool machine for manufacturing a dental restoration/appliance from a dental blank by using one or more dental tools. The present invention more particularly relates to a method of predicting the machining time for manufacturing a dental restoration or a dental appliance with the dental machining system.

BACKGROUND OF THE INVENTION

In general, a dental machining system has a dental tool machine for machining a dental blank which is typically made from ceramic. The dental tool machine generally has one or more driving units each movably holding at least one dental tool for machining the dental blank. The dental tools are respectively mounted to tool motors in the driving units. The dental tools can be exchanged after their service lifes are over. The dental blank is mounted to a dental blank holder which is relatively movable with respect to the dental tools. A control unit controls the operation of the dental tool machine. Generally, a CAD/CAM software runs on a PC connected to the control unit in the dental machining system. The CAD/CAM software is used to digitally construct a dental restoration/appliance and to provide a list of machining processes. The machining processes are used to generate the temporal trajectory of the dental tool in the dental tool machine. Usually, the machining time required for completing the machining processes are estimated before generating the temporal trajectory. Different estimation methods are known. According to a commonly known estimation method, first a rough estimation is conducted by using empirical values based on parameters such as the dental restoration/appliance class, the number of the caps in the dental restoration/appliance, the material of the dental blank, the degree of detail in the dental restoration/appliance, and the machining modes of the dental tool machine. Subsequently, a fine estimation is conducted based on the machining processes which are specifically identified for manufacturing the dental restoration/appliance. In the literature, machine learning methods are alternatively used to estimate the machining time. Reference can be made to the article of the authors Saric, T.; Simunovic, G.; Simunovic, K; & Svalina, I., titled "Estimation of Machining Time for CNC Manufacturing Using Neural Computing" published in the International Journal of Simulation Modelling. 15 (2016) 4, 663-675. In this method, process parameters of the machining processes are used as input data.

In general, the differences in the geometries of the dental restoration/appliances complicates the estimation of the machining time. A typical factor that causes the estimation to become complicated is the need of selective removal of rest material from highly uneven, restoration/appliance-specific areas to be machined, in particular undercuts.

Therefore, generally the machining time can only be estimated with poor accuracy.

SUMMARY OF THE INVENTION

An objective of the present invention is to overcome the problems of the prior art and to provide a dental machining system for accurately predicting the machining time for manufacturing a dental restoration/appliance.

This objective has been achieved through the dental machining system as defined in claim 1. The subject-matters of the dependent claims relate to further developments.

The present invention provides a dental machining system for manufacturing a dental restoration/appliance. The dental machining system comprises a dental tool machine which comprises a dental blank holder for movably holding at least one dental blank relative to one or more dental tools; one or more driving units each for movably holding one or more dental tools; and a control unit for controlling the dental blank holder and the driving units based on construction data of the dental restoration/appliance and a plurality of machining processes specific for the manufacturing of the dental restoration/appliance from the dental blank. The control unit is further adapted to execute a trained artificial intelligence algorithm adapted to predict the machining time for manufacturing the dental restoration/appliance based on input data comprising: process parameters defining the machining processes respectively; and mappings which include information on the target geometry of the dental restoration/appliance, which are constructed based on the said machining processes respectively.

A major advantageous effect of the present invention is that the dental machining system can accurately predict the machining time through the trained artificial intelligence algorithms with due consideration of the target geometry of the dental restoration/appliance. This makes it possible to accurately predict the machining time when selectively removing rest material from the restoration/appliance-specific areas to be machined, in particular undercuts. Another major advantageous effect of the present invention is that the artificial intelligence algorithm can be trained to adapt the prediction of the machining time to a change in the dental tool trajectory calculation schemes.

Another major advantageous effect of the present invention is that the trained artificial intelligence algorithm based prediction may also take account of unknown factors influencing the machining time.

According to the present invention different types of mappings may be used as input data. In an embodiment of the present invention, a first type of mapping is used to describe the target geometry of the dental restoration/appliance relative to the machining directions in the respective machining processes. The machining processes that are to be executed by the dental tool machine are preferably provided in a sequential list. Each machining process in the list also includes information on the process parameters that will be used to control the driving unit. For instance, each machining process in the list includes the machining direction relative to the target geometry of the dental restoration/appliance, and the type of the dental tool to be used. The machining directions are parallel to the dental tool. These first type of mappings preferably describe the distance from the surface of the dental restoration/appliance to a reference plane of the driving unit. Alternatively, the first type of mappings may preferably describe the distance from the surface of the dental blank to the surface of the dental restoration/appliance. The first type of mappings preferably define distance maps in two dimensions. Each distance map shows the distances through numerical values. Alternatively, colors or greyscales may be used. The input data may also include for each first type of mapping information on the type of the dental tool used for the corresponding machining process. Thanks to the first type of mappings, the amount of rest material can be determined based on the distance map and taken into consideration together preferably with the type of the dental tool by the trained artificial intelligence algorithm to predict the machining time.

In an alternative embodiment of the present invention, second type of mappings are used as input data. The second type of mappings are obtained via simulation and describe the actual geometry of the rest dental blank relative to the target geometry of the dental restoration/appliance after simulated completion of the corresponding machining processes. Also, in this embodiment, the machining process that are to be executed by the dental tool machine are preferably provided in a sequential list. The actual geometry of the rest dental blank after completion of the corresponding machining process is found via simulation. The second type of mappings preferably describe the distance of the surface of the actual geometry of the rest dental blank to the target geometry of the dental restoration/appliance after simulated completion of the corresponding machining process. The second type of mappings preferably define distance maps in three dimensions. Also, in this embodiment, each distance map shows the simulated distances through numerical values. Alternatively, colors or greyscales may be used. The surface of the actual geometry is preferably described through triangulation with attributes including the simulated distances respectively. The attributes may be located at the vertices or the triangles.

According to the present invention, the control unit of the dental machining system generates the input data based on the construction data of the dental restoration/appliance. Alternatively, the dental machining system may receive the input data and the construction data through an input means.

According to an embodiment of the present invention, the dental machining system has a training mode and an inference mode. In the inference mode, the control unit executes the trained artificial intelligence algorithm for predicting the machining time. In the training mode, the control unit is adapted to train the artificial intelligence algorithm for predicting the machining time for manufacturing the dental restoration/appliance based on input data comprising: process parameters defining the said machining processes respectively; and mappings which include information on the target geometry of the dental restoration/appliance which are constructed based on the said machining processes respectively; and actual machining times required for completing the machining processes respectively. According to the present invention, the trained artificial intelligence algorithm is based on a neural network, preferably a convolutional neural network.

In the training mode, the dental machining system uses previously generated or received input data derived from experimental or real manufacturing operations. The actual machining times are obtained by monitoring the machining processes. A database can be continually updated with such input data for the training mode.

According to an embodiment of the present invention, the dental machining system may also have a CAD/CAM module which preferably includes a computer station such as a PC that runs a CAD/CAM software. The trained artificial intelligence algorithm is preferably provided as part of the CAD/CAM module. The CAD/CAM module is preferably external to the dental tool machine and accessible through a network or the like. A plurality of different dental tool machines may use the trained artificial intelligence algorithm for the inference. The CAD/CAM module may be also provided as part of the dental tool machine. The present invention also provides a CAD/CAM software for implementing the above mentioned functions of the dental machining system. The CAD/CAM software has computer-readable codes for causing a computerized dental machining system to execute the functions. The CAD/CAM software is stored in a computer-readable storage medium. The storage medium may be portable or integrated. The storage medium may be located external or internal to the dental machining system. The storage medium may be accessible through a network or the like. The present invention can be applied to dental tool machines with various types of kinematics for moving the dental blank and the dental tools.

BRIEF DESCRIPTION OF THE DRAWINGS

In the subsequent description, further aspects and advantageous effects of the present invention will be described in more detail by using exemplary embodiments and by reference to the drawings, wherein FIG. 1—is a schematic partial perspective view of a dental tool machine of the dental machining system according to an embodiment of the present invention.

DETAILED DESCRIPTION OF THE INVENTION

Figure 1:
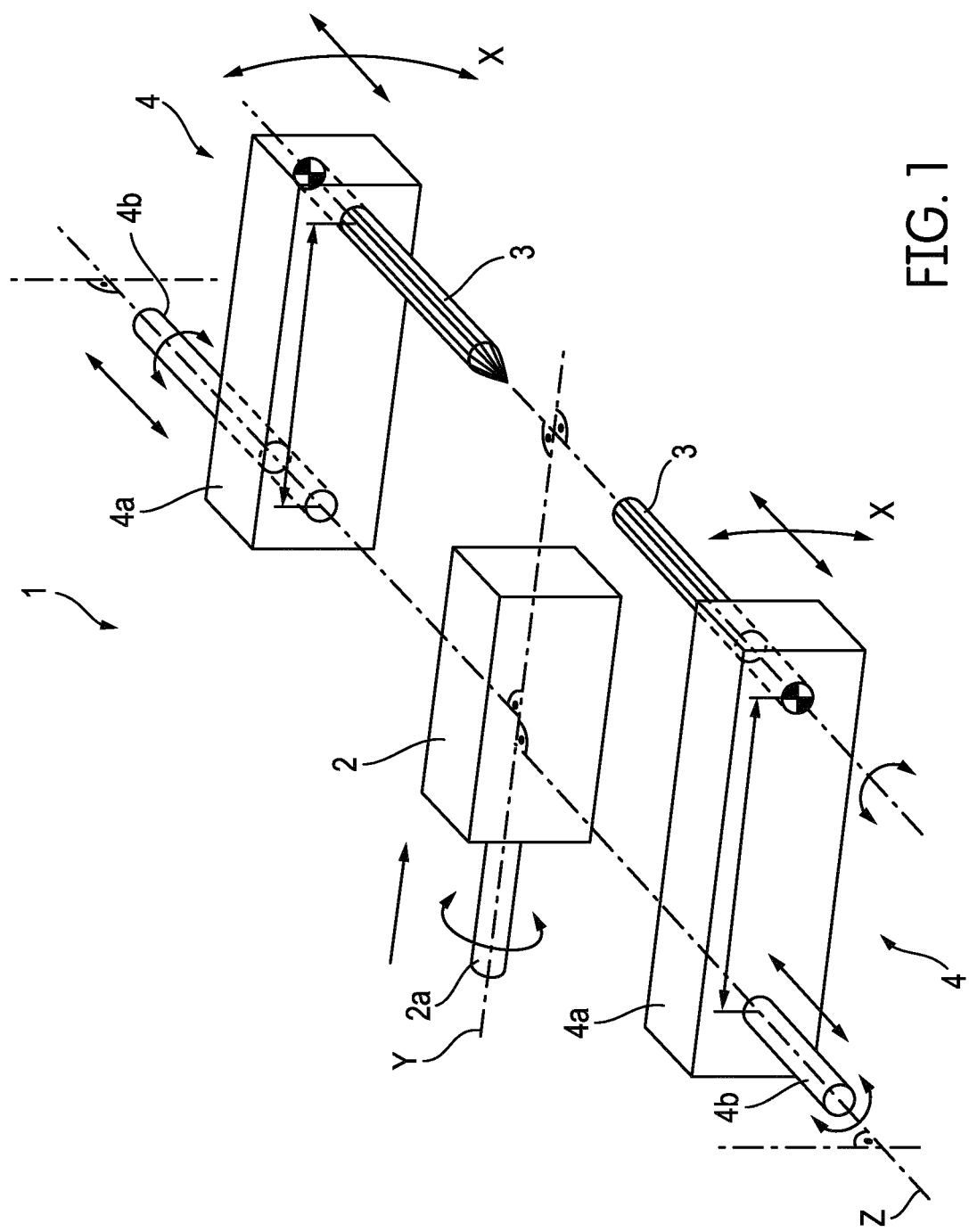

The reference numbers shown in the drawings denote the elements as listed below and will be referred to in the subsequent description of the exemplary embodiments:

1. Dental Tool Machine
2. Dental blank
2'. Rest dental blank
2a. Shaft
3. Dental tool
4. Driving unit
4a. Arm
4b. Shaft
5a, 5b. Greyscale distance maps
X,Y,Z: Directions FIG. 1 shows a dental machining system for manufacturing a dental restoration/appliance, comprising: a dental tool machine (1) which comprises: a dental blank holder for movably holding a dental blank (2) relative to the dental tools (3); two driving units (4) each for movably holding a dental tool (3), a control unit for controlling the dental blank holder and the driving units (4) based on construction data of the dental restoration/appliance and a plurality of machining processes specific for the manufacturing of the dental restoration/appliance from the dental blank (2). Each driving unit (4) has a shaft (4b) and an arm (4a) radially fixed to the shaft (4b). Each shaft (4b) can be moved in the z axis through a driving mechanism of the respective driving unit (4). Each arm (4a) can be moved around the z axis through the driving mechanism. The dental tools (3) are mounted to tool motors in the arm (4a) respectively. The dental blank (2) is joined to a shaft (2a) which can be moved along the y axis and rotated around the y axis through another driving mechanism. The control unit has a training mode and an inference mode. In the inference mode, the control unit is further adapted to execute a trained artificial intelligence algorithm adapted to predict the machining time for manufacturing the dental restoration/appliance based on input data comprising: process parameters defining the machining processes respectively; and mappings which include information on the target geometry of the dental restoration/appliance, which are constructed based on the said machining processes respectively. The process parameters comprise, for example, path distance, max feed, max acceleration and the like. The training mode will be described later. The control unit is adapted to generate the input data based on the construction data of the dental restoration/appliance. Alternatively, the input data and the construction data is input into the dental machining system through an input means.

Figure 2:
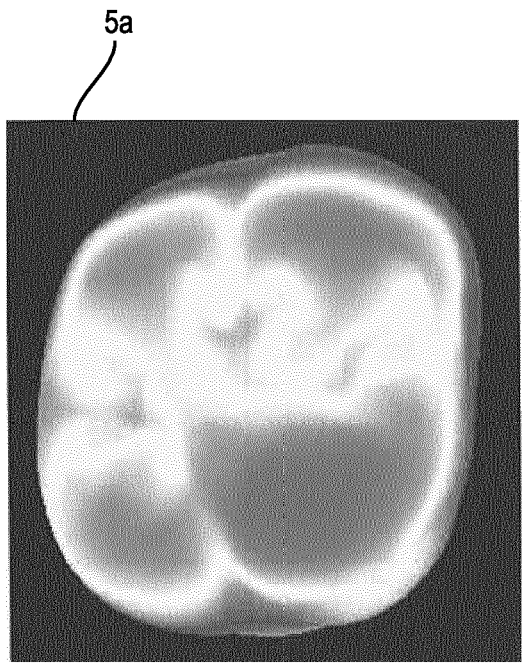
FIG. 2—is a greyscale distance map, in two dimensions, of the dental restoration/appliance viewed along the machining direction parallel to the dental tool according to an embodiment of the present invention.
Figure 3:
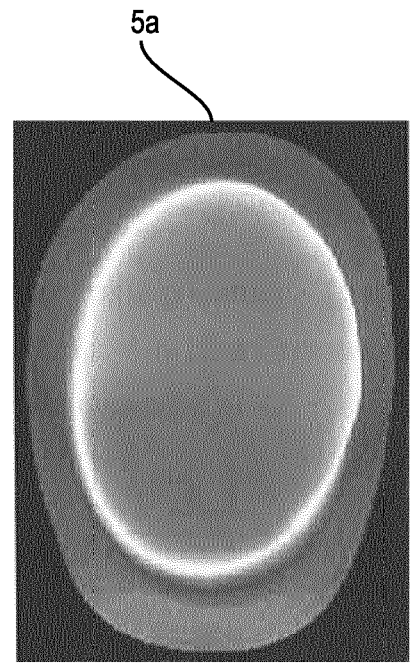
FIG. 3—is a greyscale distance map, in two dimensions, of the dental restoration/appliance viewed along the machining direction parallel to the dental tool according to another embodiment of the present invention.

In a first embodiment, the mappings comprise first type of mappings that describe the target geometry of the dental restoration/appliance relative to the machining directions (z) in said machining processes respectively. The input data also includes information on the type of the dental tool (3) used for the corresponding machining process. The machining directions (z) are parallel to the dental tool (3). The first type of mappings further describe the distance from the surface of the dental restoration/appliance to a reference plane of the driving unit (4) or the distance from the surface of the dental blank (2) to the surface of the dental restoration/appliance. The first type of mappings define distance maps respectively. FIG. 2 and FIG. 3 each show a greyscale distance map in two dimensions of the dental restoration/appliance viewed from the machining direction parallel to the dental tool according to another embodiment of the present invention. Alternatively, each distance map may show the distance through colors, or numbers. In FIG. 2, the light grey scales show the deep fissures which lead to a long machining time due to the extensive use of a small dental tool for selective removal of rest material. In FIG. 3, the target geometry is simple and leads to a short machining time. Thus, the details of the target geometry have a large influence on the resulting machining time.

Figure 4:
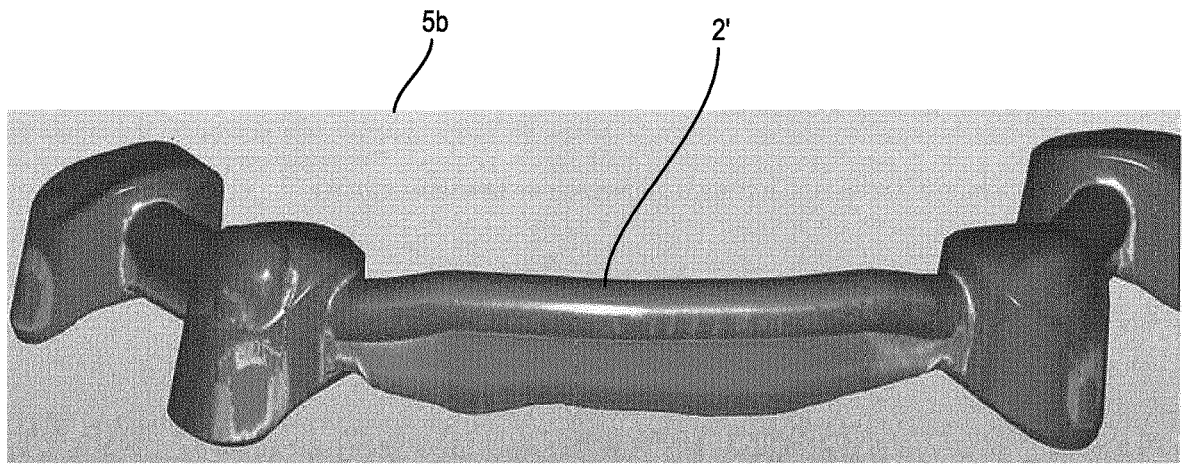
FIG. 4—is a greyscale distance map of the actual geometry of the rest dental blank relative to the target geometry of the dental restoration/appliance, before simulated completion of an undercut machining process.
Figure 5:
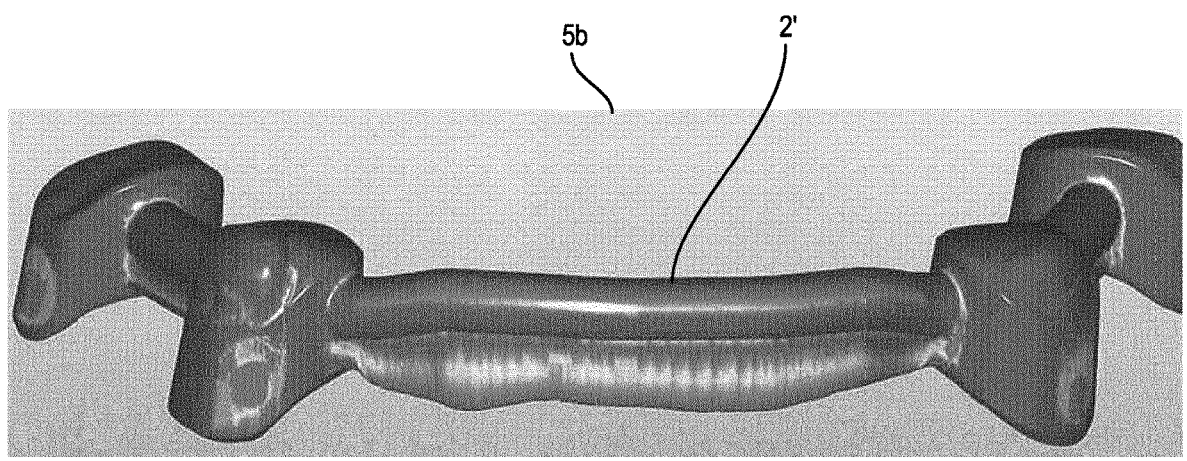
FIG. 5—is a greyscale distance map of the actual geometry of the rest dental blank relative to the target geometry of the dental restoration/appliance, after simulated completion of the undercut machining process.

In a second embodiment, the mappings alternatively comprise second type of mappings that have been obtained via simulation and describe the actual geometry of the rest dental blank (2') relative to the target geometry of the dental restoration/appliance after simulated completion of the corresponding machining processes. The second type of mappings describe the distance from the surface of the actual geometry of the rest dental blank (2') to the target geometry of the dental restoration/appliance or vice versa after simulated completion the corresponding machining process. In particular, the simulation may compute the distance from the target geometry to the actual one. These distances are obtained by simulation of the corresponding machining process. The surface of the actual geometry is described through triangulation with attributes including the simulated distances respectively. The second type of mappings define distance maps respectively obtained by simulation. FIG. 4 shows a greyscale distance map of the actual geometry of the rest dental blank (2') relative to the target geometry of the dental restoration/appliance, before simulated completion of the undercut machining processes. FIG. 5 shows a greyscale distance map of the actual geometry of the rest dental blank (2') relative to the target geometry of the dental restoration/appliance, after simulated completion of the undercut machining processes. The greyscale distance maps in FIG. 4 and FIG. 5 are obtained by simulation. Alternatively, the distance maps in FIG. 4 and FIG. 5 may show the simulated distances through colors or numbers. In FIG. 5, the light grey scales show the restoration/appliance-specific areas obtained by simulation of the undercut machining.

In the training mode, the control unit is adapted to train the artificial intelligence algorithm for predicting the machining time for manufacturing the dental restoration/appliance based on input data comprising: process parameters defining the said machining processes respectively; and mappings which include information on the target geometry of the dental restoration/appliance which are constructed based on the said machining processes respectively; and actual machining times required for completing the machining processes respectively.

The artificial intelligence algorithm is based on a neural network, in particular a convolutional neural network. Regarding the distance maps of the dental restoration/appliance in combination with an indication of the dental tools used, the convolutional neural network is able to learn geometry properties by means of training examples, which may require selective reworking by a thin dental tool (residual material removal). Furthermore, it may be possible to identify areas where only a slow feed is possible or where a special material immersion process (ZigZag) is required. These geometry dependent properties also have a large influence on the resulting machining time. During the training of the neural network based artificial intelligence algorithm, the parameters of the neural network are learned through back-propagation.

The invention claimed is:

1. A dental machining system for manufacturing a dental restoration/appliance, comprising:
    a dental tool machine which comprises:
        a dental blank holder configured to movably hold at least one dental blank relative to one or more dental tools;
        one or more driving units each configured to movably hold one or more dental tools; and
        a control unit configured to control the dental blank holder and the driving units based on construction data of the dental restoration/appliance and a plurality of machining processes specific for the manufacturing of the dental restoration/appliance from the dental blank;
    wherein the control unit is further adapted to execute a trained artificial intelligence algorithm adapted to predict a machining time for manufacturing the dental restoration/appliance based on input data comprising:
        process parameters defining the machining processes respectively; and
        mappings which include information on a target geometry of the dental restoration/appliance, which are constructed based on the said machining processes respectively;

wherein the mappings comprise: second type of mappings that have been obtained via simulation, and describe an actual geometry of a dental blank relative to the target geometry of the dental restoration/appliance after simulated completion of the corresponding machining processes.

2. The dental machining system according to claim 1, wherein the mappings comprise: first type of mappings that describe the target geometry of the dental restoration/appliance relative to machining directions (z) in said machining processes respectively, wherein the machining directions (z) are parallel to the dental tool.

3. The dental machining system according to claim 2, wherein the first type of mappings further describe a distance from a surface of the target geometry of the dental restoration/appliance to a reference plane of the driving unit or the distance from the surface of the dental blank to the surface of the target geometry of the dental restoration/appliance.

4. The dental machining system according to claim 3, wherein the first type of mappings define distance maps respectively.

5. The dental machining system according to claim 4, wherein each distance map shows the distance through colors, greyscales, or numbers.

6. The dental machining system according to claim 2, wherein the input data also includes for each first type of mapping information on the type of the dental tool to be used in the corresponding machining process.

7. The dental machining system according to claim 1, wherein the second type of mappings describe a distance of a surface of the actual geometry of the dental blank to the surface of the target geometry of the dental restoration/appliance or vice versa after simulated completion the corresponding machining processes.

8. The dental machining system according to claim 7, wherein the surface of the actual geometry or target geometry is described through triangulation with attributes including the distances respectively.

9. The dental machining system according to claim 7, wherein the second type of mappings define distance maps respectively.

10. The dental machining system according to claim 9, wherein each distance map shows the distance through colors, greyscale, or numbers.

11. The dental machining system according to claim 1, wherein the control unit is adapted to generate the input data based on the construction data of the dental restoration/appliance.

12. The dental machining system according to claim 1, further comprising an input device configured to receive the input data and the construction data.

13. The dental machining system according to claim 1, wherein the control unit is adapted to train the artificial intelligence algorithm to predict the machining time for manufacturing the dental restoration/appliance based on input data comprising:
   process parameters defining the said machining processes respectively; and
   mappings which include information on the target geometry of the dental restoration/appliance which are constructed based on the said machining processes respectively;
   and actual machining times required for completing the machining processes respectively.

14. A dental machining system for manufacturing a dental restoration/appliance, comprising:
   a dental tool machine comprising:
      a dental blank holder for movably holding at least one dental blank relative to one or more dental tools,
      one or more driving units each for movably holding one or more dental tools; and
      a control unit for controlling the dental blank holder and the driving units based on construction data of the dental restoration/appliance and a plurality of machining processes specific for the manufacturing of the dental restoration/appliance from the dental blank;
   wherein the control unit is further adapted to execute a trained artificial intelligence algorithm adapted to predict a machining time for manufacturing the dental restoration/appliance based on input data comprising:
      process parameters defining the machining processes respectively; and
      mappings which include information on a target geometry of the dental restoration/appliance, which are constructed based on said machining processes,
      wherein the mappings comprise: first type of mappings that describe the target geometry of the dental restoration/appliance relative to machining directions (z) in the respective machining processes, wherein the machining directions (z) are parallel to the one or more dental tools,
      wherein the first type of mappings further describe a distance from a surface of the target geometry of the dental restoration/appliance to a reference plane of the one or more driving units or the distance from the surface of the dental blank to the surface of the target geometry of the dental restoration/appliance.

* * * * *

UNITED STATES PATENT AND TRADEMARK OFFICE
CERTIFICATE OF CORRECTION

| | | |
|---|---|---|
| PATENT NO. | : 12,402,991 B2 | Page 1 of 1 |
| APPLICATION NO. | : 17/795156 | |
| DATED | : September 2, 2025 | |
| INVENTOR(S) | : Sebastian Steger | |

It is certified that error appears in the above-identified patent and that said Letters Patent is hereby corrected as shown below:

In the Claims

In Column 7, Line 1, in Claim 1, after "comprise:", insert a linebreak

In Column 7, Line 8, in Claim 2, after "comprise:", insert a linebreak

In Column 8, Lines 13-14, in Claim 13, after "respectively;", insert --and--

In Column 8, Line 15, in Claim 13, before "actual", delete "and"

In Column 8, Line 20, in Claim 14, delete "tools," and insert --tools;-- therefor In Column 8, Line 38, in Claim 14, after "comprise:", insert a linebreak Signed and Sealed this
Twenty-eighth Day of October, 2025

John A. Squires
*Director of the United States Patent and Trademark Office*